United States Patent Office 3,069,439
Patented Dec. 18, 1962

3,069,439
16α,17α-CYCLOPHOSPHATE AND 16α,17α-CYCLO-
PHOSPHONATE ESTERS OF 16α,17α-DIHYDROXY
STEROIDS
Josef Fried, Princeton, N.J., assignor to Olin Mathieson
Chemical Corporation, New York, N.Y., a corporation
of Virginia
No Drawing. Filed July 17, 1961, Ser. No. 124,323
11 Claims. (Cl. 260—397.45)

This invention relates to 16α,17α-cyclophosphate and 16α,17α-cyclophosphonate esters of 16α,17α-dihydroxy steroids of C-ring substituted pregnenes, that is steroids having a pregnene, pregnadiene or pregnatriene nucleus. More particularly, the invention relates to compounds represented by the formula (I)

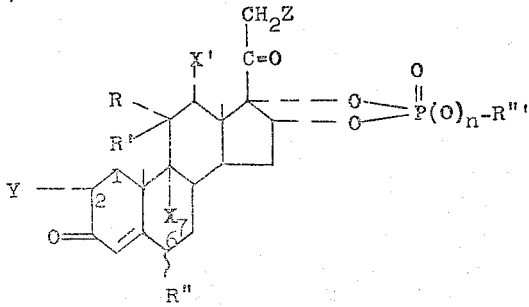

In Formula I, the 1,2- and/or 6,7-positions may be saturated or double bonded so that $\Delta^4$-, $\Delta^{1,4}$-, $\Delta^{4,6}$- and $\Delta^{1,4,6}$-pregnanes are included within the scope of this invention.

The symbols in formula have the following meanings: R represents hydrogen, R' represents β-hydroxy or together R and R' are keto (C=O); R'' represents hydrogen, halogen or lower alkyl; R''' represents a hydrocarbon radical of less than 10 carbon atoms; X and X' each represents hydrogen or halogen, but at least one of these two symbols represents hydrogen; Y represents hydrogen or lower alkyl, preferably methyl; Z represents hydrogen, halogen, hydroxy or the acyloxy radical of a hydrocarbon carboxylic acid of less than 10 carbon atoms and $n$ represents either 0 or 1.

The symbols R'', X, X'' and Z represent all four halogens but chlorine and fluorine are preferred in this group. The same or different halogens may appear in a given compound. Lower alkyl groups represented by Y and R'' include straight and branched chain saturated hydrocarbon radicals such as methyl, ethyl, propyl, isopropyl, butyl, t-butyl, amyl and the like.

The hydrocarbon radicals represented by R''' include lower alkyl groups such as those described above, monocyclic aralkyl groups, e.g. phenyl lower alkyl and alkyl- or alkoxy substituted phenyl lower alkyl groups such as benzyl, phenethyl, o-, m- and p-methylbenzyl and β-phenylpropyl, and aryl groups such as phenyl-, o-, m- and p-tolyl and the like.

Carboxylic acids from which the acyloxy radical Z may be derived to produce 21-esters include, for example, alkanoic acids, preferably lower alkanoic acids such as acetic, propionic, butyric, hexanoic acids and the like, lower alkenoic acids such as acrylic acid, monocyclic aromatic carboxylic acids such as benzoic and o-, m- and p-toluic acids, cycloalkanoic acids such as cyclohexanoic acid, cycloalkenoic acids such as cyclohexenoic acid, and monocyclic aryl-lower alkanoic acids such as phenylacetic and β-phenylpropionic acids.

The 16α,17α-cyclophosphate and 16α,17α-cyclophosphonate esters e.g. cyclophenylphosphonate, cyclophenylphosphate, cyclomethylphosphate, cyclobenzylphosphate and cyclobenzylphosphonate, of the following C-ring substituted-16α,17α-dihydroxypregnenes are compounds of this invention. They and the working examples which follow serve to illustrate the class of esters included.

16α-hydroxyhydrocortisone, 16α-hydroxyhydrocortisone 21-acetate, 2α-methyl-16α-hydroxyhydrocortisone, 9α-fluoro-16α-hydroxyhydrocortisone, 12α - chloro-16α-hydroxyhydrocortisone, 6α-methyl-16α-hydroxyhydrocortisone, 6α-fluoro-16α-hydroxyhydrocortisone, 6α,9α - difluoro-16α-hydroxyhydrocortisone, 9α,21-difluoro-$\Delta^4$-pregnene-11β,16α,17α-triol 3,20-dione.

16α-hydroxycortisone, 16α-hydroxycortisone 21-acetate, 2α-methyl-16α-hydroxycortisone, 9α-fluoro-16α-hydroxycortisone, 12α-fluoro-16α-hydroxycortisone, 6α-methyl-16α hydroxycortisone, 6α - chloro-16α-hydroxycortisone, 6α,9α-difluoro-16α-hydroxycortisone, 9α,21 - difluoro-$\Delta^4$-pregnene-16α,17α-diol-3,11,20-trione.

16α-hydroxyprednisolone, 9α-fluoro-16α-hydroxyprednisolone, 12α-chloro-16α-hydroxyprednisolone, 6α-methyl-16α-hydroxyprednisolone, 6α-fluoro-16α-hydroxyprednisolone, 6α,9α-difluoro-16α-hydroxyprednisolone, 9α,21-difluoro-$\Delta^{1,4}$-pregnadiene-11β-16α,17α-triol-3,20-dione.

16α-hydroxyprednisone, 16α-hydroxyprednisone 21-acetate, 9α-fluoro - 16α - hydroxyprednisone, 12α-fluoro-16α-hydroxyprednisone, 6α-methyl - 16α-hydroxyprednisone, 6α-chloro-16α-hydroxyprednisone, 6α,9α-difluoro-16α-hydroxyprednisone.

9α-fluoro-$\Delta^4$-pregnene-11β,16α,17α-triol-3,20-dione, 9α-fluoro-$\Delta^{1,4}$-pregnadiene-16α,17α-diol - 3,11,20 - trione, 21-fluoro-$\Delta^4$-pregnene-11β,16α,17α-triol - 3,20 - dione, 12α-fluoro-$\Delta^4$-pregnene,11β,16α,17α-triol-3,20 dione, 6α-methyl-9α-chloro-$\Delta^4$-pregnene-11β,16α,17α-triol-3,20-dione, 6α, 9α-difluoro-$\Delta^4$-pregnene-11β,16α,17α-triol-3,20 dione, 9α-21-difluoro-$\Delta^{1,4,6}$-pregnatriene - 11β,16α,17α - triol-3,20-dione, 12α - fluoro-$\Delta^{1,4,6}$-pregnatriene-11β,16α,17α-triol-3,20-dione.

The compounds of this invention can be prepared by reacting a compound of the formula (II)

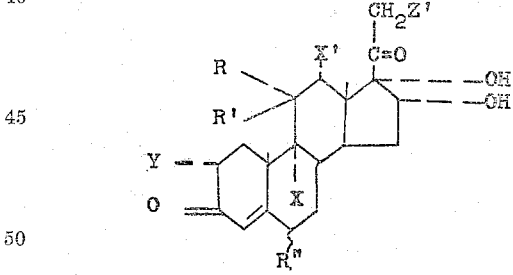

wherein the 1,2- and/or 6,7-positions are saturated or double bonded, R, R', R'', X, X', and Y have the same meaning as before and Z' represents hydrogen, halogen or the acyloxy radical of a hydrocarbon carboxylic acid of less than 10 carbon atoms, with a dihalide of the formula (III) 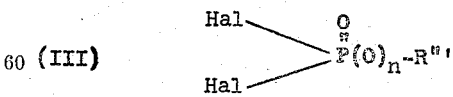

wherein R''' and $n$ have the meaning defined above and Hal represents a halogen, preferably chlorine.

Such dihalides include, for example, phenylphosphonyl dichloride, benzyl-phosphonyl dichloride, phenylphosphoryl dichloride, methylphosphoryl dichloride and the like. The reaction is carried out in the presence of an organic nitrogen base such as pyridine, collidine, triethanolamine, quinoline or the like and the product is recovered from the solution by conventional procedures. Preferably the compound of Formula II is dissolved or suspended in the basic medium and then treated with an equimolar proportion or excess of the dihalide at a temperature below or about 0° C.

The starting materials of Formula I are known substances or are readily obtained from known compounds. Thus 16α,17α-dihydroxy compounds may be obtained from their known 17α-hydroxy analogs by enzymatic hydroxylation at the 16-position by means of the microorganism *Streptomyces roseochromogenus* according to the method described in U.S. Patent No. 2,855,343. Similarly, compounds saturated in the 1,2-position may be converted to the corresponding 1,2-unsaturated compound by the action of *Bacterium cyclooxydans* according to the method described in Example 1 of U.S. Patent No. 2,822,318.

Compounds of Formula II bearing 12α-halo and/or 6α-methyl substituents may be produced as described in my co-pending application Serial No. 677,205, filed August 9, 1957 and now abandoned.

The 21-acyloxy-16α,17α-diol starting materials for the compounds of this invention can be obtained by treating the corresponding 16α,17α,21-triols with an acid anhydride in pyridine and separating the resulting mixture by fractional crystallization. An alternate, more lengthy but more general procedure involves the treatment of the 16α,17α,21-triol with a ketone (e.g. acetone) or the aldehyde in the presence of an acid catalyst (e.g. perchloric acid) to yield the corresponding 16α,17α-ketal or acetal which is then treated with an acyl chloride (e.g. acetyl chloride) or an acid anhydride (e.g. acetic anhydride) in a basic organic medium (e.g. pyridine) to form the corresponding 21-acyloxy-16α,17α-ketal or acetal. The latter is converted by hydrolysis with aqueous formic acid to the desired 21-acyloxy-16α,17α-diol by the procedure described in my copending application Serial No. 84,989, filed January 26, 1961.

The 21-halo-16α,17α-diol starting materials for the compounds of this invention are prepared by converting the corresponding 16α,17α,21-triol to its 16α-17α-ketal or acetal as described above, treating the latter with an organic sulfonyl chloride (e.g. tosyl chloride or mesyl chloride) to prepare the 21-sulfonyloxy derivative which is then 21-halogenated by treatment with an alkali metal halide (e.g. potassium bifluoride, lithium chloride, lithium bromide and sodium iodide). The latter is converted to the desired 21-halo-16α,17α-diol compound by hydrolyzing off the 16α,17α-acetal or ketal grouping with formic acid.

When a 6,7-saturated steroid is used as the starting material and a 6-dehydrofinal product is desired, the latter may be obtained by treating the 6,7-saturated-16α-17α-cyclic esters of this invention with a dehydrogenating agent capable of selectively dehydrogenating this position. A suitable dehydrogenating agent is chloranil in ethyl acetate and acetic acid.

Among the starting materials of Formula II which may be used to produce the products of Formula I are the following:

The 21-esters of 16α-hydroxyhydrocortisones, such as the 21-acetates of 16α-hydroxyhydrocortisone, 2α-methyl-16α-hydroxyhydrocortisone, 9α-fluoro-16α-hydroxyhydrocortisone, 12α-chloro-16α-hydroxyhydrocortisone, 6α-methyl - 16α - hydroxyhydrocortisone, 6α - fluoro - 16α-hydroxyhydrocortisone, and 6α,9α-difluoro-16α-hydroxyhydrocortisone.

The 21-esters of hydroxycortisones such as the 21-acetates of

16α-hydroxycortisone,
2α-methyl-16α-hydroxycortisone,
9α-fluoro-16α-hydroxycortisone,
12α-fluoro-16α-hydroxycortisone,
6α-methyl-16α-hydroxycortisone,
6α-chloro-16α-hydroxycortisone,
6α-fluoro-16α-hydroxycortisone, and
6α,9α-difluoro-16α-hydroxycortisone.

The 21-esters of 16α-hydroxyprednisolones such as the 21 acetates of

16α-hydroxyprednisolone,
9α-fluoro-16α-hydroxyprednisolone,
12α-chloro-16α-hydroxyprednisolone,
6α-methyl-16α-hydroxyprednisolone,
6α-fluoro-16α-hydroxyprednisolone,
6α,9α-difluoro-16α-hydroxyprednisolone.

The 21-esters of 16α-hydroxyprednisones such as the 21-acetates of

16α-hydroxyprednisone,
9α-fluoro-16α-hydroxyprednisone,
12α-fluoro-16α-hydroxyprednisone,
6α-methyl-16α-hydroxyprednisone,
6α-chloro-16α-hydroxyprednisone,
6α,9α-difluoro-16α-hydroxyprednisone.

11-hydroxy- or 11-keto-$\Delta^4$-pregnene-16α,17α-diol 3,20-diones such as

9α-fluoro-$\Delta^{1,4}$-pregnadiene-16α,17α-diol-3,11,20-trione,
21-fluoro-$\Delta^4$-pregnene-11β,16α,17α-triol-3,20-dione,
9α-fluoro-$\Delta^4$-pregnene-11β,16α,17α-triol-3,20-dione,
12α-fluoro-$\Delta^4$-pregnene-11β,16α,17α-triol-3,20-dione,
6α-methyl-9α-chloro-$\Delta^4$-pregnene-11β,16α,17α-triol-3,20-dione,
6α-chloro-$\Delta^4$-pregnene-16α,17α-diol-3,11,20-trione and
6α,9α-difluoro-$\Delta^4$-pregnene-11β,16α,17α-triol-3,20-dione,
9α-fluoro-$\Delta^{1,4,6}$-pregnatriene-11β,16α,17α-triol-3,20-dione,
12α-fluoro-$\Delta^{1,4,6}$-pregnatriene-11β,16α,17α-triol 3,20-dione,
12α-fluoro-$\Delta^{1,4,6}$-pregnatriene-16α,17α-diol-3,11,20-trione.

The compounds of this invention are physiologically active substances which possess glucocorticoid and antiinflammatory activities and hence can be used in lieu of known glucocorticoids such as hydrocortisone and cortisone in the treatment of rheumatoid arthritis for which purpose they can be administered in the same manner as, for example, hydrocortisone, the dosage being adjusted for the relative potency of the particular steroid. They may be administered orally, for example, in the form of tablets or capsules by incorporating a therapeutic dosage with a carrier according to conventional practice.

The following examples are presented to more fully illustrate the present invention (all temperatures being expressed in degrees centigrade).

EXAMPLE 1

*Triamcinolone 16α,17α-Cyclophenylphosphonate 21-Acetate*

A. *Preparation of triamcinolone 21-acetate.*—A solution of 500 mg. of triamcinolone and .195 ml. (1.6 moles) of acetic anhydride in 8 ml. of pyridine is allowed to stand at room temperature for 20 hours. After removal of the reagents in vacuo, the residue is triturated with chloroform, the resulting crystals filtered, and washed with chloroform. The crystalline precipitate after recrystallization from acetone furnishes about 130 mg. of pure triamcinolone 21-monoacetate having the following properties: M.P. 218–220° and 227–229°; $[\alpha]_D$ +57° (c., .37 in acetone);

$\lambda_{max.}^{alc.}$ 238 mμ (ε = 13,600); $\lambda_{max.}^{Nujol}$ 2.88 (shoulder), 2.98, 5.75, 5.82, 6.04, 6.20 and 6.25μ.

*Analysis.*—Calc'd for $C_{23}H_{29}O_7F$ (436.46): C, 63.29; H, 6.69. Found: C, 63.21; H, 6.81.

B. *Preparation of triamcinolone 16α,17α-cyclophenylphosphonate 21-acetate.*—To a solution of 1 g. of triamcinolone 21-monoacetate in 30 ml. of pyridine is added with stirring at −15°, 2 ml. of phenylphosphonyl dichloride. The reaction is allowed to proceed at −15° for 2.5 minutes after which time ice water is added. Chloroform is added to the mixture and the layers are separated. The chloroform extract is washed with water, 1 N sulfuric acid, water, dilute sodium bicarbonate solution and again with water, dried over sodium sulfate and the solvent removed in vacuo. The resulting residue (about 1.2 g.) is dissolved in 10 ml. of chloroform and 50 ml. of benzene and chromatographed on 20 g. of neutral alumina. Elution of the column with 500 ml. of a mixture of one part of chloroform and 5 parts of benzene yields about 560 mg. of crystalline material, which after recrystallization from acetone-hexane represents analytically pure triamcinolone $16\alpha,17\alpha$-cyclophenylphosphonate 21-acetate possessing the following properties: M.P. 288–289°; $[\alpha]_D^{23}$ +130° (c., 1.12 in chlf.);

$\lambda_{max}^{Nujol}$ 2.99, 5.74, 5.78, 6.06, 6.22, 6.28, 8.25 to 8.29$\mu$.

*Analysis.*—Calc'd for $C_{23}H_{27}O_8SF$ (482.50): C, 57.24; H, 5.64; S, 6.65. Found: C, 57.60; H, 5.68; S, 6.32.

EXAMPLE 2

*Triamcinolone $16\alpha,17\alpha$-Cyclophenylphosphonate*

To a solution of 100 mg. of triamcinolone $16\alpha,17\alpha$-cyclophenylphosphonate 21-acetate in 10 ml. of methanol is added under nitrogen 1 ml. of a 10% solution of potassium carbonate in water. The mixture is allowed to stand at room temperature for ½ hour after which the mixture is acidified with 0.1 ml. of glacial acetic acid, 2 ml. water are added and the methanol removed in vacuo. The resulting crystalline precipitate is filtered off, washed with water and dried to yield the product triamcinolone $16\alpha,17\alpha$-cyclophenylphosphonate.

EXAMPLE 3

*Triamcinolone $16\alpha,17\alpha$-Cyclophenylphosphate 21-Acetate*

To a solution of 100 mg. of triamcinolone 21-acetate in 3 ml. of pyridine is added at —15° with stirring 0.1 ml. of phenylphosphoryl dichloride. The reaction is allowed to proceed at —15° for 15 minutes, after which time ice water is added and the mixture extracted with chloroform. The chloroform extract is washed with water, 1 N sulfuric acid, water, dilute sodium bicarbonate, again with water, dried over sodium sulfate and the chloroform removed in vacuo. The resulting residue constitutes triamcinolone-$16\alpha,17\alpha$-cyclophenylphosphate 21-acetate after recrystallization from 95% alcohol.

EXAMPLE 4

*6-Dehydrotriamcinolone $16\alpha,17\alpha$-Cyclophenylphosphonate 21-Acetate*

A solution of 250 mg. of the product of Example 1B and 1.250 g. of recrystallized chloranil in 15 ml. of tert. butanol is heated under reflux for three hours. The mixture is cooled, filtered, the filtrate poured into water and the layers separated. After an additional extraction of the aqueous layer with ethyl acetate, the ethyl acetate extract is washed with a 1 N sodium hydroxide solution until the aqueous layer becomes colorless. The washed extract is dried over sodium sulfate and evaporated to dryness in vacuo leaving as residue the product 6-dehydrotriamcinolone $16\alpha,17\alpha$-cyclophenylphosphonate 21-acetate.

EXAMPLE 5

*$9\alpha,21$-Difluoro-$\Delta^{1,4}$-Pregnadiene-$11\beta,16\alpha,17\alpha$-Triol-3,20-Dione $16\alpha,17\alpha$-Cyclophenylphosphonate*

To a solution of 1 g. of triamcinolone acetonide in 10 ml. of anhydrous pyridine is added at 0° 1 ml. of methanesulfonyl chloride. After two hours at 0°, ice water is added and the precipitated mesylate is removed by filtration. The precipitate is washed thoroughly with water and dried in vacuo, then recrystallized from acetone-hexane. The triamcinolone acetonide 21-mesylate melts at about 248–250° (dec.) or 286–287° (dec.) (polymorphic forms).

A mixture containing 1 g. of triamcinolone acetonide 21-mesylate, 1 g. of potassium fluoride and 25 ml. of ethylene glycol is refluxed (180°) for 19 hours. The dark solution is poured into ice water and extracted with chloroform. The chloroform extract is washed with water, dried over sodium sulfate and evaporated to dryness in vacuo. The residue, $16\alpha,17\alpha$-isopropylidene-$9\alpha,21$-difluoro-$\Delta^{1,4}$-pregnadiene-$11\beta,16\alpha,17\alpha$-triol-3,20-dione, is recrystallized from acetone with the aid of charcoal and melts at about 310°.

The above product is deacetonated by treatment with formic acid by the procedure of Example 7 of my copending application Serial No. 84,989, filed January 26, 1961, to obtain $9\alpha,21$-difluoro-$\Delta^{1,4}$-pregnadiene-$11\beta,16\alpha,17\alpha$-triol-3,20-dione.

Treatment of the above products with phenylphosphonyl dichloride in pyridine at —15° for 2.5 minutes in accordance with the procedure of Example 1B yields the final product $9\alpha,21$-difluoro-$\Delta^{1,4}$-pregnadiene-$11\beta,16\alpha,17\alpha$-triol-3,20-dione $16\alpha,17\alpha$-cyclophenylphosphonate.

EXAMPLE 6

*21-Chloro-$9\alpha$-Fluoro-$\Delta^{1,4}$-Pregnadiene-$11\beta,16\alpha,17\alpha$-Triol-3,20-Dione $16\alpha,17\alpha$-Cyclophenylphosphate*

A solution of 200 mg. of triamcinolone acetonide 21-mesylate and 900 mg. of lithium chloride in 25 ml. of dimethylformamide is kept at 100° for 24 hours. The mixture is poured on ice, extracted with chloroform and the chloroform extract washed with water and dried over sodium sulfate. Evaporation of the solvent in vacuo yields 21-chloro-$9\alpha$-fluoro-$\Delta^{1,4}$-pregnadiene-$11\beta,16\alpha,17\alpha$-triol-3,20-dione 16,17-acetonide which melts at about 310° after recrystallization from acetoneethanol.

By further processing the above product as described in Example 3, 21-chloro-$9\alpha$-fluoro-$\Delta^{1,4}$-pregnadiene-$11\beta,16\alpha,17\alpha$-triol-3,20-dione $16\alpha,17\alpha$-cyclophenylphosphate is obtained.

EXAMPLE 7

*$6\alpha$-Fluorotriamcinolone $16\alpha,17\alpha$-Cyclomethylphosphate 21-Propionate*

A. *Preparation of $6\alpha$-fluorotriamcinolone 21-propionate.*—A solution of 200 mg. of $6\alpha$-fluorotriamcinolone acetonide in 1 ml. of pyridine and 0.5 ml. of propionic anhydride is allowed to remain at room temperature for twenty hours. After removal of the reagents in vacuo the residue $16\alpha,17a$-acetonide of $6\alpha$-fluorotriamcinolone 21-propionate is deactonated with 60% formic acid at 100° according to the procedure described in Example 5, thereby yielding $6\alpha$-fluorotriamcinolone 21-propionate.

B. *Preparation of $6\alpha$-fluorotriamcinolone cyclomethylphosphate 21-propionate.*—To a solution of 1 g. of the product of part A in 30 ml. of pyridine is added, with stirring, at —15°, 2 ml. of methylphosphoryl dichloride. The reaction mixture is treated as in Example 1B to yield the product $6\alpha$-fluorotriamcinolone $16\alpha,17\alpha$-cyclomethylphosphate 21-propionate.

EXAMPLE 8

*$6\alpha$-Fluorotriamcinolone $16\alpha,17\alpha$-Cyclophenylphosphate 21-Propionate*

To a solution of 100 mg. of $6\alpha$-fluorotriamcinolone-21-propionate in 3 ml. of pyridine is added at —15° with stirring 0.1 ml. of phenylphosphonyl dichloride. The reaction is allowed to proceed at —15° with stirring for 15 minutes, after which time ice water is added and the mixture extracted with chloroform. The extract is washed with water, 1 N sulfuric acid, water, dilute sodium bicarbonate, again with water, dried over sodium sulfate and the chloroform removed in vacuo. The residue is recrystallized from 95% alcohol to obtain the product, $6\alpha$-fluorotriamcinolone $16\alpha,17\alpha$-cyclobenzylphosphonate 21-propionate.

EXAMPLE 9

*2α-Methyltriamcinolone 16α,17α-Cyclobenzylphosphate 21-Acetate*

200 mg. of 2α-methyl-triamcinolone 21-acetate (prepared by sequentially acetonating, acetylating and deacetonating 2α-methyl triamcinolone in accordance with the procedure of Example 7A) is dissolved in 3 ml. of pyridine and treated at −15° with stirring with 2 ml. of benzylphosphoryl dichloride in accordance with the procedure of Example 1B thereby yielding the product 2α - methyltriamcinolone - 16α,17α - cyclobenzylphosphate 21-acetate.

EXAMPLE 10

*2α-Methyl-16α-Hydroxyhydrocortisone 16α,17α-Cyclophenylphosphonate 21-Acetate*

2α-methyl-16α-hydroxyhydrocortisone 21-acetate (prepared by sequentially acetonating, acylating and deacetonating 2α-methyl-16α-hydroxyhydrocortisone in accordance with the procedure in Example 7A) is treated in a solution of pyridine with phenylphosphonyl dichloride as described in Example 1B thereby yielding the product 2α-methyl-16α-hydroxyhydrocortisone 16α,17α-cyclophenylophosphonate 21-acetate.

EXAMPLE 11

*2α-Methyl-16α-Hydroxyhydrocortisone 16α,17α-Cyclophenylphosphate 21-Acetate*

Following the procedure of Example 3, 2α-methyl-16α-hydroxycortisone 21-acetate in pyridine is treated with phenylphosphoryl dichloride. The reaction yields the product 2α-methyl-16α-hydroxycortisone 16α,17α-cyclophenylphosphate 21-acetate.

EXAMPLE 12

*2α-Methyl-6-Dehydro-16α-Hydroxyhydrocortisone 16α,17α-Cyclophenylphosphate 21-Acetate*

The product of the preceding example is treated with recrystallized chloranil in accordance with the procedure of Example 4 yielding the product 2α-methyl-6-dehydro-16α - hydroxyhydrocortisone 16α,17α - cyclophenylphosphate 21-acetate.

EXAMPLE 13

*12α-Chloro-16α-Hydroxycortisone-16α,17α-Cyclophenylphosphate 21-Acetate*

Substitution of 1 g. of 12α-chloro-16α-hydroxycortisone-21-acetate (prepared by sequentially treating 12α-chloro-16α-hydroxycortisone with acetone and perchloric acid, acetic anhydride and pyridine and 60% formic acid in accordance with the procedure of Example 7A) is treated wtih phenylphosphonyl dichloride in accordance with the procedure of Example 1B thereby yielding the product 12α-chloro-16α-hydroxycortisone 16α,17α-cyclophenylphosphonate 21-acetate.

The corresponding free 21-ol is obtained by hydrolysis of the 21-acetate with a solution of potassium carbonate.

EXAMPLE 14

*12α-Chloro-16α-Hydroxycortisone 16α,17α-Cyclobenzylphosphonate 21-Acetate*

To a solution of 100 mg. of 12α-chloro-16α-hydroxycortisone 21-acetate in 3 ml. of pyridine is added at −15° with stirring 0.1 ml. of benzylphosphonyl dichloride. The reaction is allowed to proceed at −15° for 15 minutes after which time ice water is added and the mixture extracted with chloroform. The chloroform extract is washed with water, 1 N sulfuric acid, water, dilute sodium bicarbonate, again with water, dried over sodium sulfate and the chloroform removed in vacuo. The resulting residue after recrystallization from 95% alcohol yields the product, 12α-chloro-16α-hydroxycortisone 16α,17α-cyclobenzylphosphonate 21-acetate.

EXAMPLE 15

*Δ¹-12α-Chloro-16α-Hydroxycortisone 16α,17α-Cyclobenzylphosphonate 21-Acetate*

The product of Example 14 is enzymatically dehydrogenated by the action of *Bacterium cyclooxydans* in accordance with the procedure of Example 1 of U.S. Patent No. 2,822,318 yielding the product Δ¹-12α-chloro-16α-hydroxycortisone 16α,17α - cyclobenzylphosphonate 21-acetate.

This invention may be variously otherwise embodied within the scope of the appended claims.

What is claimed is:

1. A compound selected from the group consisting of steroids of the formula

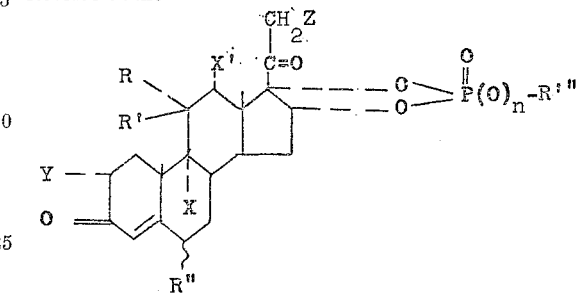

and the 1,2- and 6,7-unsaturates thereof, wherein R represents hydrogen, R' represents β-hydroxy and together R and R' are keto; R'' represents a member of the group consisting of hydrogen, chlorine, fluorine and lower alkyl; R''' represents a hydrocarbon radical of less than 10 carbon atoms; X and X' each represents a member of the group consisting of hydrogen, chlorine and fluorine, at least one representing hydrogen; Y represents a member of the group consisting of hydrogen and lower alkyl; Z represents a member of the group consisting of hydrogen, chlorine, fluorine, hydroxy and the acyloxy radical of a hydrocarbon carboxylic acid of less than 10 carbon atoms; and $n$ represents an integer from 0 to 1.

2. A compound of the formula

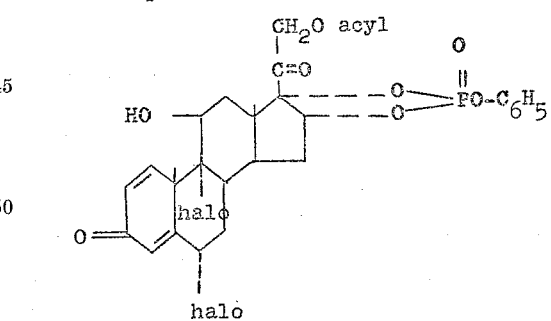

wherein the acyloxy group is the acyloxy radical of a hydrocarbon carboxylic acid of less than 10 carbon atoms and the halo group is a member of the group consisting of chlorine and fluorine.

3. A compound of the formula

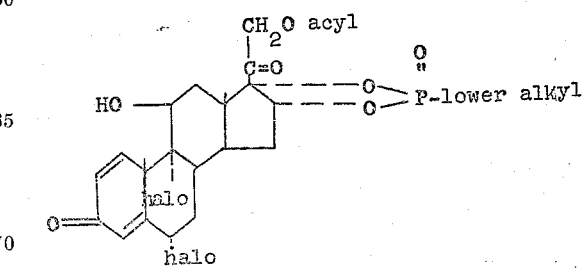

wherein the acyloxy group is the acyloxy radical of a hydrocarbon carboxylic acid of less than 10 carbon atoms and the halo group is a member of the group consisting of chlorine and fluorine.

4. A compound of the formula

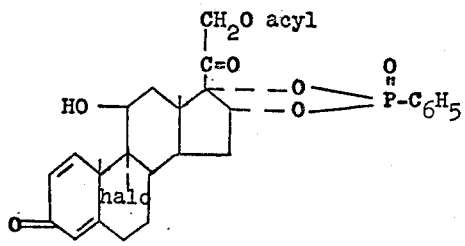

wherein the acyloxy group is the acyloxy radical of a hydrocarbon carboxylic acid of less than 10 carbon atoms and the halo group is a member of the group consisting of chlorine and fluorine.

5. A compound of the formula

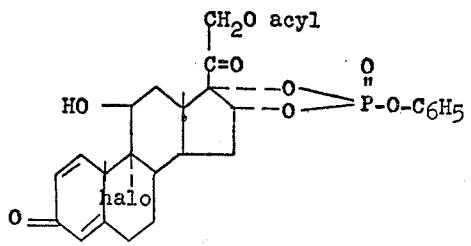

wherein the acyloxy group is the acyloxy radical of a hydrocarbon carboxylic acid of less than 10 carbon atoms and the halo group is a member of the group consisting of chlorine and fluorine.

6. Triamcinolone 16α,17α-cyclophenylphosphonate 21-acetate.

7. Triamcinolone 16α,17α-cyclophenylphosphate 21-acetate.

8. 9α-fluoro-16α-hydroxyhydrocortisone 16α,17α-cyclophenylphosphonate 21-acetate.

9. 9α,21-difluoro-$\Delta^{1,4}$-pregnadiene-11β,16α,17α-triol-3,20-dione 16α,17α-cyclophenylphosphonate.

10. 6α-fluorotriamcinolone 16α,17α-cyclomethylphosphate 21-propionate.

11. The process for the preparation of the compounds of claim 1 which comprises treating a member selected from the group consisting of compounds of the formula:

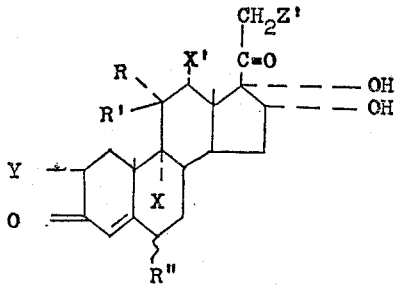

and the 1,2- and 6,7-unsaturates thereof, wherein R, R′, R″, X, X′ and Y are as defined in claim 1 and Z′ is a member selected from the group consisting of hydrogen, halogen and the acyloxy radical of a hydrocarbon carboxylic acid of less than ten carbons, in an organic basic medium, with a dihalide of the formula

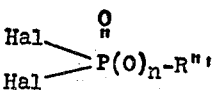

wherein R‴ and $n$ are as defined in claim 1 and Hal represents halogen.

No references cited.